No. 686,206. Patented Nov. 5, 1901.
C. J. COLEMAN.
REPEATER FOR TELEPHONE CIRCUITS.
(Application filed Nov. 8, 1899.)
(No Model.)

Witnesses:
R. J. Jacker,
J. D. Chubb

Inventor:
Clyde J. Coleman
By Jones & Addington
Attorneys.

UNITED STATES PATENT OFFICE.

CLYDE J. COLEMAN, OF CHICAGO, ILLINOIS, ASSIGNOR, BY MESNE ASSIGNMENTS, TO GEORGE B. FRENCH, OF BOSTON, MASSACHUSETTS, AND FRANK L. HALL, OF NEW YORK, N. Y.

REPEATER FOR TELEPHONE-CIRCUITS.

SPECIFICATION forming part of Letters Patent No. 686,206, dated November 5, 1901.

Application filed November 8, 1899. Serial No. 736,299. (No model.)

*To all whom it may concern:*

Be it known that I, CLYDE J. COLEMAN, a citizen of the United States, residing at Chicago, in the county of Cook and State of Illinois, have invented a certain new and useful Improvement in Repeaters for Telephone-Circuits, of which the following is a full, clear, concise, and exact description, reference being had to the accompanying drawings, forming a part of this specification.

My invention relates to a repeater for telephone-circuits, my object being to provide means for amplifying the current in the circuit, whereby the distance of transmission may be increased. In an application filed by me October 28, 1899, Serial No. 735,041, I have described and generically claimed a system wherein a supplemental source of energy is provided, which is controlled by the current produced by the transmitter to produce a vibrating or undulatory current, the variations of which are amplified to any desired degree. In said application I have illustrated and described one embodiment of the generic principle above referred to, and the present application relates to another embodiment of the same general principle.

In accordance with the present invention I provide a transmitter at the transmitting-station for producing an undulatory current and employ a source of dynamic energy and a supplemental transmitter, and provide electromagnetic means, controlled by the undulatory current, for transforming the dynamic energy into mechanical vibrations of the supplemental transmitter corresponding to the undulations of the transmitter-current. The receiver at the receiving-station responds to the undulations of current produced by the supplemental transmitter. Since the supplemental transmitter is vibrated by energy supplied through an external source and the transmitter-current serves only to control the same, the undulations may be amplified to any desired degree.

I have illustrated my invention in the accompanying drawings, in which—

Figure 1:
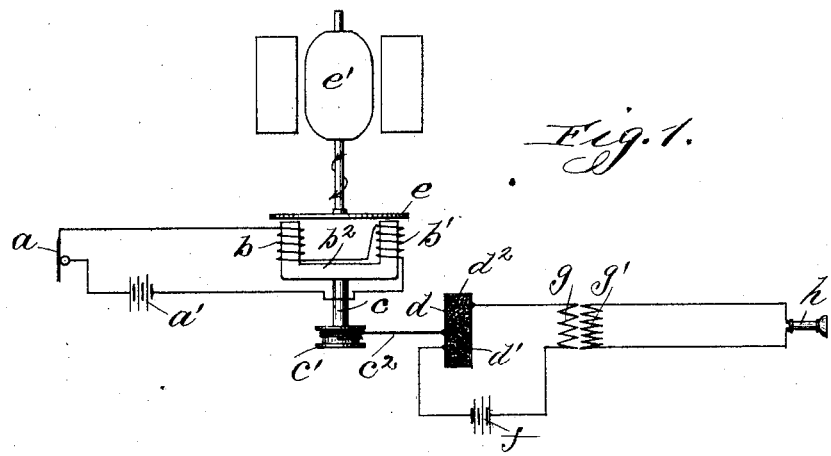
Figure 2:
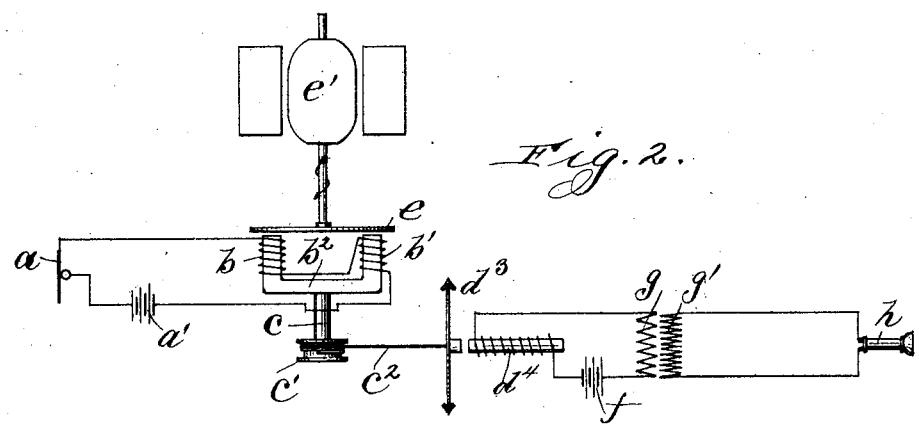

Figure 1 is a diagram illustrating my invention. Fig. 2 is a diagram of a modification.

Like letters refer to like parts in both figures.

The transmitter $a$ in circuit with the battery $a'$ is connected with coils $b\ b'$, mounted upon the poles of a polarized magnet $b^2$, which magnet is carried on a shaft $c$, which supports a drum $c'$, having wrapped around the same a cord $c^2$, connected with the diaphragm $d$ of the supplemental transmitter. Opposite the poles $b\ b'$ of the magnet $b^2$ a magnetic disk or keeper $e$ is rotated by means of an electric motor or other source of dynamic energy $e'$. Between the diaphragm $d$ and a back plate $d'$ the usual granular carbon $d^2$ is interposed, and the diaphragm and back plate are connected with the opposite poles of a battery $f$, in circuit with which is the primary $g$ of an induction-coil, the secondary $g'$ of which extends to the receiving-station and is connected in circuit with receiver $h$. The disk is continuously rotated at a uniform speed, and the permanent magnetism of magnet $b^2$ attracts the same with a normally uniform force. When a vibrating current is sent over the line by means of the transmitter $a$, the strength of the poles of magnet $b^2$ is varied to cause the same to attract the disk $e$ with varying force, and the shaft $c$, carrying the magnet, is thus rocked or oscillated back and forth correspondingly. This oscillation imparts a corresponding vibration to the diaphragm $d$ through the agency of the cord $c^2$ and drum $c'$, and this vibration of the diaphragm $d$ varies the resistance of the circuit of battery $f$, thereby producing a vibrating current through winding $g$, which induces a corresponding current in winding $g'$, and this latter current traverses the receiver at the receiving-station.

In Fig. 2 I have illustrated a modification of my invention in which the supplemental transmitter comprises a core $d^4$, having a helix thereon and having the diaphragm $d^3$, carrying an armature, situated opposite the same, said diaphragm being connected by cord $c^3$ with the drum $c'$.

Having described my invention, what I claim as new, and desire to secure by Letters Patent, is—

1. The combination with a transmitter for producing an undulating current, of a magnet mounted to oscillate, and having its field subjected to said undulating current, a supplemental transmitter associated with said oscillating magnet to be operated thereby, a source of dynamic energy, as a motor, and a circular disk rotated opposite the poles of said magnet by said source of dynamic energy, substantially as described.

2. The combination with a telephone-transmitter, of an oscillating magnet whose field is varied by the current of said transmitter, a drum carried on said oscillating magnet, a supplemental transmitter controlled by said drum, a motor, and a keeper for said motor rotating opposite the poles of said magnet, substantially as described.

3. The combination with a transmitter for producing an undulating current, of a magnet mounted to oscillate and having its field subjected to said undulating current, a supplemental transmitter associated with said oscillating magnet to be vibrated thereby, a source of dynamic energy, as a motor, and a keeper rotated opposite the poles of said magnet by said source of dynamic energy, substantially as described.

4. The combination with an electromagnet mounted to partake of a limited vibration, of a telephone-transmitter for varying the field thereof, a supplemental transmitter adapted to be vibrated in unison with said magnet, a telephone-receiver in circuit with said supplemental transmitter, and a keeper adapted to be moved at a uniform speed through the field of said magnet, substantially as described.

5. The combination with a horseshoe-magnet adapted to oscillate, of a transmitter for varying the field thereof, a drum mounted on said magnet, a cord attached to said drum, a supplemental transmitter controlled by said cord, an electric motor, and a disk rotated by said motor opposite the poles of said magnet, substantially as described.

In witness whereof I have hereunto subscribed my name in the presence of two witnesses.

CLYDE J. COLEMAN.

Witnesses:
E. L. ASHBAUGH,
CHARLES PLATNER.